(No Model.)
L. H. TAYLOR.
STEAM COOKER.
No. 371,228. Patented Oct. 11, 1887.
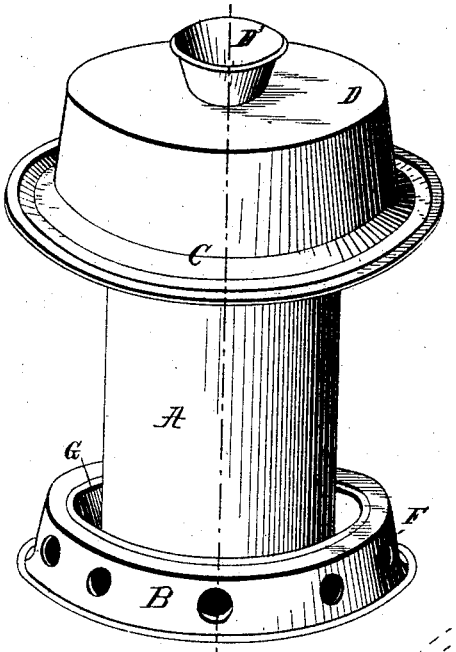
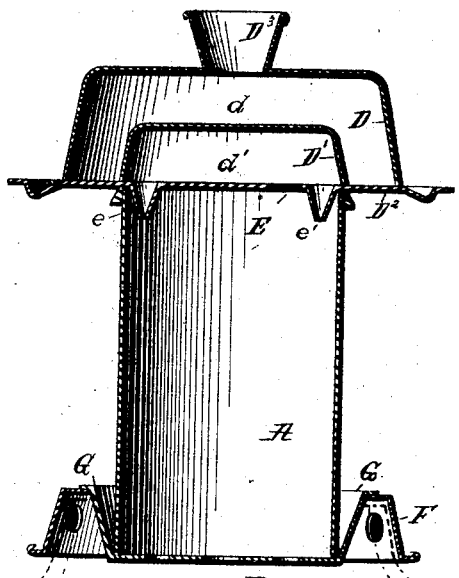
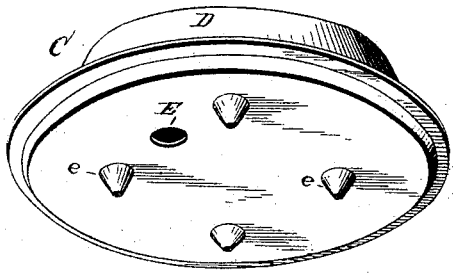
Witnesses.
M. A. Barnes
Van Buren Hillyard.
Inventor.
Lawrence H. Taylor
By R. S. & A. P. Lacey
Attys.

UNITED STATES PATENT OFFICE.

LAWRENCE H. TAYLOR, OF MERCER, MAINE, ASSIGNOR OF ONE-HALF TO FRANK SMITH, OF SAME PLACE.

STEAM-COOKER.

SPECIFICATION forming part of Letters Patent No. 371,228, dated October 11, 1887.

Application filed May 11, 1887. Serial No. 237,860. (No model.)

*To all whom it may concern:*

Be it known that I, LAWRENCE H. TAYLOR, a citizen of the United States, residing at Mercer, in the county of Somerset and State of Maine, have invented certain new and useful Improvements in Steam-Cookers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to steam-cookers of that class which employ condensing-covers to condense the steam which would otherwise be spent, so that but very little water is required to do the cooking, as the water of condensation is used over and over, and the flavor of the fruit or vegetables is preserved and not allowed to saturate the surrounding atmosphere.

The object of this invention is to improve this class of cookers and simplify the cost of construction of the same, and increase their efficiency and convenience for use.

The improvement further consists in the novel features of construction, hereinafter more fully described and claimed, and shown in the annexed drawings, in which—

Figure 1 is a perspective view of a steam-cooker embodying my invention; Fig. 2, a vertical central sectional view on the line $x$ $x$ of Fig. 1, showing the device applied to a kettle, the upper portion of which is shown by dotted lines; Fig. 3, a perspective view of the condensing-cover.

The cooker is composed of the vessel A, for holding the substance to be cooked, the support B, and the condensing-cover C, which comprises or is made up of an outer and inner shell, D and D', respectively, the plate $D^2$, and the mouth-piece $D^3$. The outer and inner shells are preferably basins inverted and having their edges soldered to the plate or ordinary cover, $D^2$, thereby forming the two compartments—the water-compartment $d$ and the steam-space $d'$. The outer shell, D, is centrally apertured, and the mouth-piece $D^3$, which is a patty-pan of ordinary construction having the bottom removed, is secured to the shell D about the aperture therein. That portion of the cover $D^2$ opposite the steam-space $d'$ is provided with a series of different-sized openings. The larger opening is for admitting the steam into the steam-space, where it is condensed by the cooling medium in the compartment $d$, and the smaller openings allow the water of condensation to escape back into the vessel. The spouts $e$ surround the smaller openings; but the larger opening, E, is left as formed by the punch.

The support is composed of two pans, F and G. The pan G is placed within the pan F, and is soldered thereto, and that portion of the bottom of the pan F opposite the pan G is cut away, so as that the vessel A may rest upon the bottom of the pan G, which is perforated and designed to fit within the end of a small pan, while the sides of the pan F, which are perforated, overlap and embrace the same; or the support may be placed in the pot with the edges of the pan F resting upon the shoulders of the pit of the said pot. In practice the substance to be cooked is placed within the vessel A, which is set upon the support, and the support is placed over a pan or in a pot or kettle, and resting upon the pit of said pot or kettle. The cover is next placed in position. The steam arising enters the steam-space through the opening E, and is condensed therein, and escapes by way of the tubes $e$, which hold the condensing-cover in position upon the vessel A.

If desired to cook more than one kind of food at the same time, use a pot or kettle in the manner set forth, and fill the space between the outside of the vessel A and the inner sides of the pot or kettle with the second kind. The third kind is placed in a steamer, such as is in common use. The steamer is then placed over the pot or kettle in the usual manner, when the condensing-cover is placed in position upon it.

Having thus described my invention, what I claim, and desire to secure by Letters Patent, is—

1. The combination, with the plate having different-sized openings and the short tubes extended from the smaller openings, of the outer and inner shells secured to the plate, substantially as and for the purpose described.

2. The herein shown and described condensing-cover, composed of the outer and inner shells, the plate secured to the shells and forming two compartments, and provided with different-sized openings opposite the inner compartment, the short tubes surrounding and projected from the smaller openings, and the mouth-piece, substantially as set forth.

3. The combination, with the vessel, of the support composed of the two pans F and G, constructed as described, and the condensing-cover composed of the shells D D', the plate $D^2$, and the mouth-piece $D^3$, substantially as described.

In testimony whereof I affix my signature in presence of two witnesses.

LAWRENCE H. TAYLOR.

Witnesses:
RUHAMAH CROSWELL,
HENRY T. CROSWELL.